Oct. 4, 1955　　　　J. F. MONROY　　　　2,719,790
HALFTONE SCREEN
Filed Nov. 14, 1951　　　　　　　　　　2 Sheets-Sheet 1
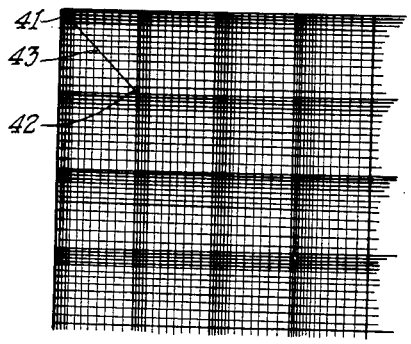
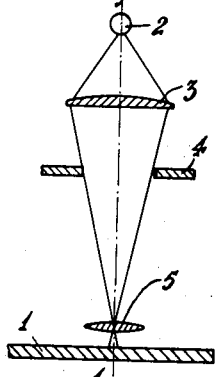
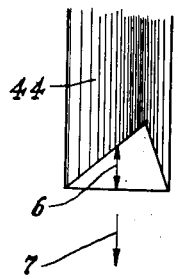
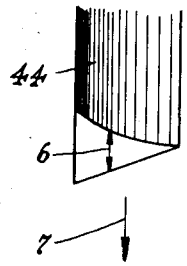
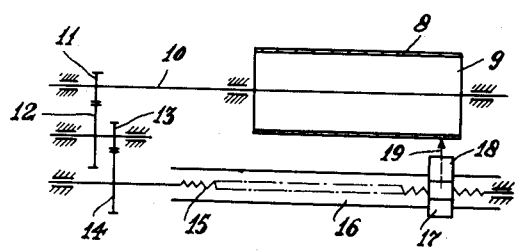
INVENTOR
JOHAN FREDERIK MONROY
BY Robert B. Larson
ATTORNEY Oct. 4, 1955          J. F. MONROY          2,719,790
                      HALFTONE SCREEN
Filed Nov. 14, 1951                    2 Sheets-Sheet 2
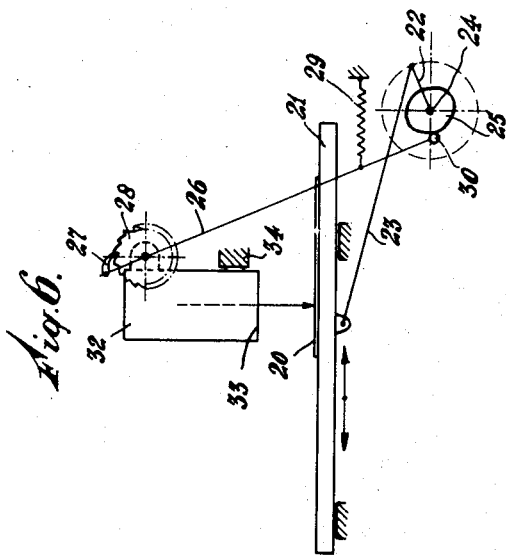
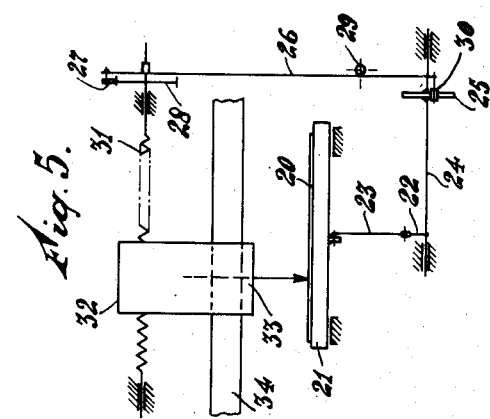
INVENTOR
JOHAN FREDERIK MONROY

United States Patent Office 2,719,790
Patented Oct. 4, 1955

2,719,790

HALFTONE SCREEN

Johan F. Monroy, Amsterdam, Netherlands, assignor to Stichting Instituut Voor Grafische Techniek T. N. O., Amsterdam, Netherlands, a corporation of the Netherlands Application November 14, 1951, Serial No. 256,173

Claims priority, application Netherlands November 15, 1950

1 Claim. (Cl. 95—81)

The invention relates to halftone screens for photomechanical work and to a method for the production of such screens.

The usual method for making line screens is to engrave the desired lines on a transparent plate, generally of glass, and subsequently to fill the grooves with an opaque substance, producing thereby alternating opaque and transparent lines.

The rather considerable forces necessary to engrave the plate have a very unfavourable influence on the precision of the work.

To alleviate this, another method to produce the grooves has been developed, consisting in first coating the glass plate with wax, cutting the desired lines into the wax layer and subsequently etching. Extreme care is however necessary if a screen of acceptable precision is to be produced.

The disadvantages set out above are especially true for halftone screens, which, as known, generally consist of two line-screens, produced by one of the methods described above, cemented crosswise to each other.

In process work regularity of lines in a screen is one of the principal requirements for achieving good results. Production of good quality screens is a highly specialized and difficult work, which makes such screens very expensive.

A further drawback of the known methods is that they do not allow the production of so-called gradation screens, i. e. the halftone screens having lines whose opacity varies transversely to their length direction.

It is known that in process work, rendering halftones by dots of equal density and varying size, considerable improvement of the results may be obtained by the use of a gradation screen. This improvement consists in a better rendering of the original especially in the halftone range. A gradation screen allows therefore to correct the fundamental imperfections of the photomechanical process work. All the usual methods for the production of gradation screens start from existing ordinary screens (i. e. having lines of uniform opacity), made as described above, and these methods come down to superimposing several exposures of such a screen, on the same sheet or plate of photo-sensitive material, but at various distances between the screen and the sheet or plate. This method produces lines, having several opacity steps transversely to their lengths, but not a continuous opacity gradation. It is also possible to make one single exposure during which the distance from the screen to the sensitive material is modified. This method however is very complicated and costly and does not permit to distribute the opacity variation in the lines of the screen to achieve optimal results in halftone work.

One of the objects of the invention is to provide a new method to make halftone screens, which has the advantage of simplicity, inexpensiveness and precision.

Another object of the invention is to provide a method to make gradation screens having within the individual lines composing the rulings of said screens any desired transverse opacity graduation.

A further object of the invention is to provide a gradation screen having within each individual line of its ruling any desired transverse opacity graduation.

Yet another object of the invention is to provide a gradation screen composed of lines whose opacity shows a continuous increase from a minimum to a maximum transversely to the lines. Such a screen has proved to give excellent results in halftone work unattainable with other kinds of screens.

Other objects and advantages will appear more fully from the following description taken in connection with the accompanying drawing in which:

Fig. 1 shows the principle of the method according to the invention;

Figs. 2 and 3 show two embodiments of diaphragm openings according to the invention with the resulting screen lines (the latter on a very enlarged scale);

Fig. 4 schematically represents one of the embodiments of the apparatus to make screens according to the invention;

Fig. 5, also schematically, shows a front elevation of another embodiment of such an apparatus;

Fig. 6 shows a side elevation of the apparatus according to Fig. 5;

Fig. 7 shows, on a very enlarged scale, a gradation screen according to the invention.

In Fig. 1 the reference numeral 1 represents a sheet or plate of photo-sensitive material, 2 a light source, 3, 4 and 5 an optical system provided with a condenser 3, a diaphragm 4 and a lens 5.

The condenser 3 provides a uniform light distribution in the diaphragm plane, and a reduced picture of the diaphragm opening will be projected by the lens 5 upon the photographic material 1.

A constant-velocity rectilinear motion is now imparted either to the photographic material or to the illuminating and optical system, so that the light spot constituted by the projection of the diaphragm on the surface of the photographic material will travel over it along a straight line. After this movement is completed, the light spot is made to travel again, equidistantly to the first path and at a very small distance therefrom, subsequently a third movement is imparted to the light spot parallel to the second one, and so forth, producing a ruling which will become apparent after development and fixing of the photographic material.

In order to make a halftone screen two of the plates or sheets processed as described above may according to current practice be cemented to each other with their ruling at right-angles. Another, more advantageous method is the following one:

After a first set of latent lines has been produced on the plate or sheet by making the light spot travel over it as set out above, said sheet or plate is turned round 90 degrees and the process is repeated so that another set of latent lines is drawn at right-angles to the first one, whereupon the sheet or plate is developed and fixed.

It will be readily understood that opacity graduation across each individual line of the screen thus produced will depend upon the local exposure or, with other words, upon the shape of the diaphragm aperture.

Let us consider a light spot produced by the projection of the uniformly illuminated diaphragm aperture upon the sheet or plate of sensitive material moving over said material with a constant-velocity rectilinear motion. It is easy to see that the total exposure at any given point will be the product of illumination intensity by exposure time, the latter being in its turn the product of velocity with which the light spot travels over the surface of the sensitive material by the focal length of the light spot, i. e. the distance between the front and the back limits of the spot at the considered point in the direction of the spot motion.

If the front and the back limits of the light spot are parallel, each point located on the path of the light spot will receive the same exposure and the opacity of each line of the screen ruling will be a constant one. The simplest way to achieve this is to give the diaphragm aperture a rectangular shape with two sides parallel to the motion direction of the light spot.

It will be readily understood that if the forward and the rearward edges of the diaphragm aperture are not parallel, the exposure will no more be a uniform one.

If, as shown in Fig. 2, the diaphragm aperture is a triangular one, the distance 6 between the forward and the rearward edge thereof, taken in the direction 7 of the movement of the spot over the surface of the sensitive material, will no more be a constant. The numeral 44 indicates on a very magnified scale the screen line which will be the result of the light spot moving over the sensitive material. The opacity of this line will no more be a uniform one: it will be lowest at the edges of the line and highest at that portion of the line which corresponds to the greatest value of the distance 6 between the two edges of the aperture. The opacity distribution in 44 is schematically shown by hatching in order to make it reproducible in print. In reality the line 44 of the screen will obviously be a continuous one, with opacity varying in transverse direction.

Fig. 3 is similar to Fig. 2 and shows another transverse opacity variation of the screen lines. Here the maximum of opacity is along one of the line edges and decreases gradually towards the other one. This opacity graduation is produced by an aperture of triangular or substantially triangular shape, positioned as shown in Fig. 3. The complete halftone screen built up of screen lines similar to those of Fig. 3 is shown in Fig. 7. Its peculiar advantages will be discussed more in detail with reference to this figure further below.

It is obviously possible to achieve any desired opacity variation in the screen lines by giving the diaphragm aperture an adequate shape.

It will be understood, that while in Fig. 1 a definite optical and illuminating system is schematically represented and described in the specification with reference to said figure, other embodiments will readily present themselves to the mind of one skilled in the art without departing from the scope of the invention.

Fig. 4 shows schematically an embodiment of the apparatus for producing screens according to the method set out above. The general principle of this device corresponds in general lines with that of a lathe. The flexible photo-sensitive material 8 is fastened to a drum 9, to which a uniform rotation is imparted in any suitable way. The shaft 10 and a gear system consisting of wheels 11, 12, 13 and 14 transmit the rotational movement to the lead screw 15, causing the slide 17 to move along the guide 16 parallel to the axis of the drum 9. The illuminating and optical system 18 is mounted on the slide 17, so that the light spot is formed upon the material 8 by the light beam 19 describes a helical path relative to the drum, providing thereby the sensitive material with a latent ruling of parallel straight lines.

In order to produce a crossed-line screen, the photo-sensitive material is removed from the drum 9 after the first exposure, and fastened to it anew but now in a different position, e. g. at right-angles with the first one. The second exposure provides the material with a latent ruling crossing the first one. Thereupon the sensitive material is removed from the drum and processed in the usual manner.

Figs. 5 and 6 show schematically another embodiment of the apparatus for producing screens according to the invention. The general lay-out of this apparatus mainly corresponds to that of a planer. The photo-sensitive material 20 is fastened to a table 21, to which a reciprocating movement is imparted by the crank 22 and the connecting rod 23. The crank-shaft 24 is provided with a cam 25 cooperating with a lever 26. This lever can carry out an oscillating movement about the shaft 31 and is provided at its end with a pawl 27 cooperating with a ratchet-wheel 28 which is fastened to the shaft 31. The shape of the cam 25 is such that the pawl engages and moves the ratchet-wheel over a certain angle at each reversal of the reciprocating movement.

A spring 29 maintains the roller 30 of the lever in permanent contact with the cam 25.

The shaft 31 is provided with a screw thread to act as a lead screw for the slide 32. The slide movably mounted on the guide 34 and provided with an illuminating and optical system is displaced over a short distance perpendicularly to the movement of the table 21 at every reversal of the movement of said table. The light beam describes a set of latent parallel lines on the sensitive material which are subsequently made visible by suitable processing.

As set out above a halftone screen may be produced by placing the sensitive material after the first set of exposures in another position on the table 21, e. g. at right-angles. By repeating the exposures, another set of latent lines is drawn over the sensitive material, and a subsequent processing will produce the cross-line ruling of the screen.

It will be readily understood that the breadth of the lines, their spacing and the opacity graduation across them may be varied as desired.

An embodiment of the halftone screen according to the invention is shown on a very magnified scale in Fig. 7. In this embodiment the horizontal lines have their highest opacity along their upper edges, gradually decreasing to zero towards their lower ones. Similarly, the vertical lines have their highest opacity along their left-hand edges, gradually decreasing to zero towards their right-hand ones. The opacity graduation, which within each line is a continuous one, is represented at this figure by a hatching to make it reproducible in print. There are no transparent bands to separate the lines from each other, the highest opacity of one line being adjacent the zero opacity of the neighbouring one.

The superposition of two rulings at right-angles creates squares with maximum opacity in the left upper corner 41, and zero opacity in the right lower one 42. By adequate choice of diaphragm aperture it may be achieved that the density values along the diagonal line 43 within each of the squares may have any desired progression, e. g. a linear one. It is further apparent that if a pair of mutually perpendicular lines are drawn which intersect at the diagonal 43, these lines being perpendicular to the lower side and right side respectively of the square as viewed in Fig. 7, that locations along one line of this pair will have the same opacity as homologous locations along the other line of the pair.

The very great advantage of such a halftone screen is that the opacity graduation within each line of the screen allows a very faithful reproduction of halftones in print. This advantage is enhanced in the special embodiment of Fig. 7, wherein the screen is composed of squares with the opacity varying along the diagonals. The length of a diagonal being $\sqrt{2}$-times greater than the breadth of a line, the correct dimensioning of dots to reproduce faithfully the halftones is greatly facilitated. Moreover, due to the absence of transparent bands between the opaque lines, the quantity of dots per square inch is increased resulting in a closer structure of the print, thereby enhancing the illusion of a continuous tone.

What I claim is:

A variable density screen for photo-mechanical reproduction purposes comprising a sheet of transparent material provided with contiguous substantially square dots, the opacity of each dot in the direction of one diagonal varying continuously from a maximum adjacent one end of the diagonal to a minimum adjacent the other end of the diagonal, said direction being the same for all dots, each location on a dot having an opacity equal to the opacity of the homologous locations on the other dots, locations along one line of any one pair of mutually perpendicular lines drawn intersecting at said diagonal and perpendicular to two sides of the square dot having the same opacity as homologous locations along the other line of the pair.

References Cited in the file of this patent

UNITED STATES PATENTS

| | | |
|---|---|---|
| 2,095,015 | Von Kujawa | Oct. 5, 1937 |
| 2,183,204 | Reynolds | Dec. 12, 1939 |
| 2,387,048 | Alger | Oct. 16, 1945 |
| 2,405,291 | Corbett | Aug. 6, 1946 |